Patented Sept. 7, 1926.                                                    1,598,821

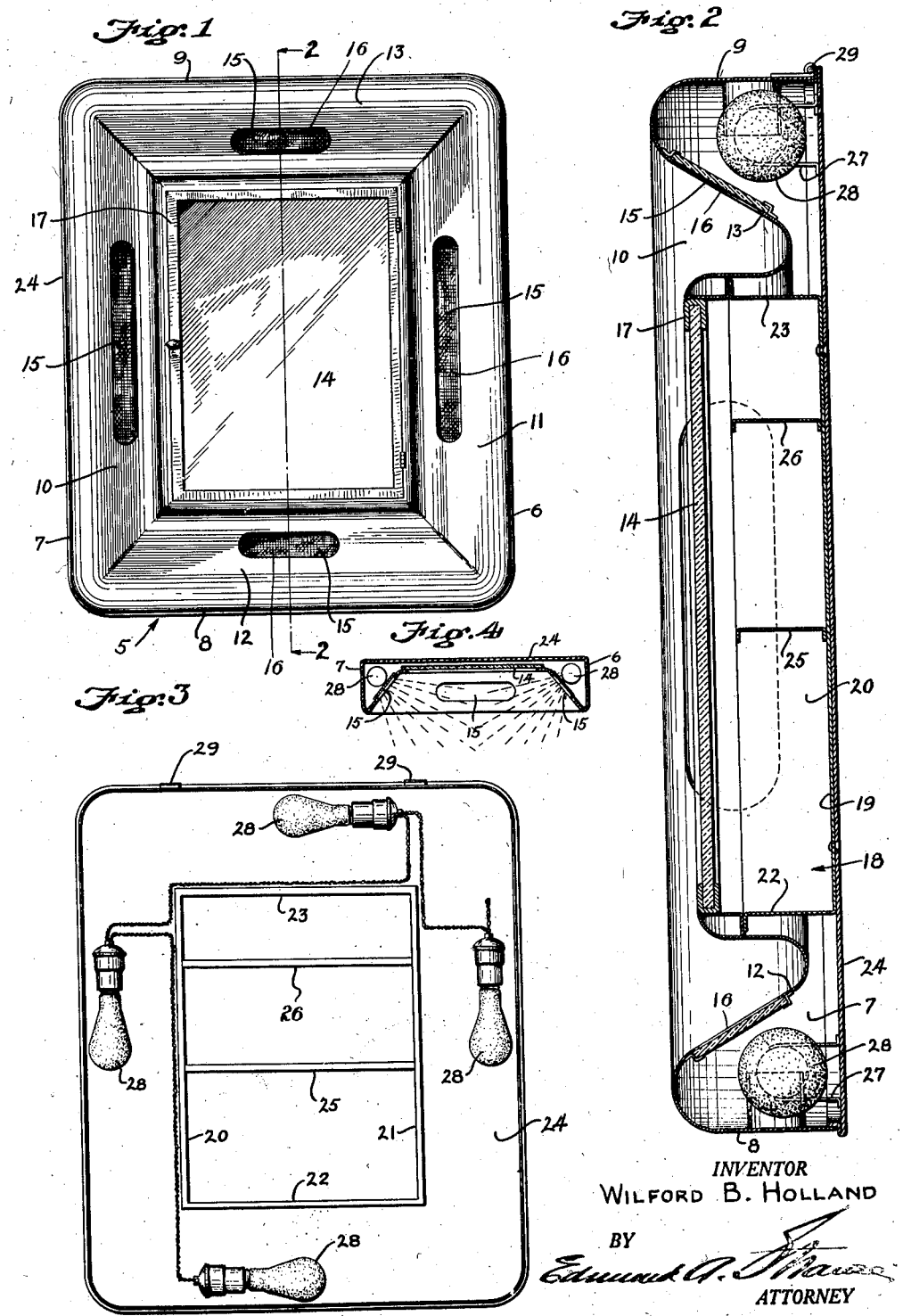

UNITED STATES PATENT OFFICE.

WILFORD B. HOLLAND, OF ANAHEIM, CALIFORNIA.

LIGHTING DEVICE FOR MIRRORS.

Application filed May 23, 1925. Serial No. 32,361.

This invention relates to a lighting device designed to be employed in connection with the illumination of mirrors.

An important object of this invention is to provide a lighting frame construction for mirrors in which the light is reflected directly upon a person standing before the same to obtain a perfect reflection without the usual attendant shadows.

Another object is to provide a device that will effectually diffuse the light upon a person without a glare and at an angle so that the entire face is uniformly illuminated.

Still another object is to provide a lighting device for mirrors which is of simple construction, portable, and in which the electric bulbs may be readily replaced in case of necessity.

This disclosure is to be regarded as descriptive only and not as restrictive or limitive of the invention, of which obviously an embodiment may be constructed including many minor modifications without departing from the general scope herein indicated and hereinafter claimed.

In the drawings accompanying this specification:

Fig. 1 is a front elevation of the mirror lighting device.

Fig. 2 is an enlarged vertical section taken on the line 2—2 of Fig. 1.

Fig. 3 is a face view of the device with the mirror and front frame removed, to disclose the arrangement of the illuminating lamps.

Fig. 4 is a diagrammatic cross section of a modified form.

Broadly this invention consists of a glass mirror provided with a hollow metallic frame, the walls of the frame adjacent the mirror being disposed at an angle to the mirror surface and having light openings for directing rays of light from the lamps mounted behind the frame directly upon a person standing in front of the mirror, in order that his image may be clearly reflected in the same without shadows. Provision is also made whereby convenient access to the lamps may be had for the purpose of renewing the same.

Referring now more specifically to the drawings, 5 designates a hollow sheet metal frame, substantially rectangular in form, consisting of vertical side walls 6, 7, top and bottom walls 8, 9, respectively. The inner walls 10, 11, 12, 13, adjacent the mirror 14 being arranged at an angle thereto, and provided with a plurality of light openings 15 having glass screens 16, to effectively diffuse the light projected therethrough and to prevent glare.

The inner portions of the angular walls are bent outwardly and are disposed in planes parallel to the side, bottom and top walls of the frame in order to provide closet space within the frame, the mirror 14 being secured in any suitable manner to the closet door 17 that is secured by hinges to one of the vertical outwardly bent walls of the frame. The closet portion 18 is also formed of sheet metal and consists of a flat back plate 19, having side and end walls 20, 21, 22, 23, respectively, secured thereto, the back plate being riveted or otherwise secured to the frame base plate 24, and a pair of shelves 25, 26, being secured between the side walls 20, 21.

Mounted on the face of the frame base plate 24 in suitable clips 27, are electric lamps 28 connected in multiple, the circuit wire leading to a source of electric energy, not shown. The lamps 28 are disposed in register with the screened light openings 15 formed in the angular walls of the frame in order that the maximum amount of light may be directed therethrough. The top wall 9 of the frame is secured to the top transverse edge of the back plate by hinges 29, in order that the frame may be swung away from said plate to provide access to the lamps mounted thereon when it is desired to renew the same.

In Fig. 4 a modified form is shown in which the closet construction is omitted, the mirror frame being secured to the inner edges of the angular walls, in all other respects the frame and lighting arrangement is substantially the same as in the form heretofore described.

By arranging the walls of the metal frame adjacent the mirror at an angle thereto, the light from the lamps will be directed through the screened openings onto the person looking into the mirror, thereby providing a perfect reflection without shadows.

As each of the angular walls are provided with a light opening it will be apparent that the light from the lamps will be equally and uniformly directed to all portions of the person who may be disposed in front of the mirror, the screens in the openings preventing any undue glare.

Although the frame is illustrated in rectangular formation, it will be understood that other configurations such as round and oval forms may be employed if desired. Further it may be made into a "built in" type, and may be used in situations other than illustrated and described.

What I claim is:

A lighting device for mirrors, comprising a mirror, a frame back plate, a hollow frame secured to said back plate and surrounding said back plate, said frame being hinged to said mirror, the walls of said frame adjacent said mirror being disposed at an angle thereto and converging inwardly from their outer edges toward the mirror and having light openings formed therein, and a plurality of electric lamps mounted on the frame back plate for directing light rays through said frame openings upon a person disposed in front of a mirror, whereby the person may obtain a reflection without shadows.

In witness that I claim the foregoing I have hereunto subscribed my name this 20th day of April, 1925.

WILFORD B. HOLLAND.